United States Patent [19]

Chizmadia

[11] Patent Number: 5,464,232
[45] Date of Patent: Nov. 7, 1995

[54] LOCKING TOOL HOLDER APPARATUS

[75] Inventor: Alex R. Chizmadia, Warren, Mich.

[73] Assignee: Illinois Tool Works Inc., Glenview, Ill.

[21] Appl. No.: 201,813

[22] Filed: Feb. 25, 1994

[51] Int. Cl.⁶ .................................................... B23B 31/16
[52] U.S. Cl. .......................... 279/124; 269/262; 279/153
[58] Field of Search ..................................... 279/123, 124, 279/153; 269/257, 259, 260–262

[56] References Cited

U.S. PATENT DOCUMENTS

| | | | |
|---|---|---|---|
| 2,460,877 | 2/1949 | Hohwart et al. | 279/46 |
| 2,464,507 | 3/1949 | Hohwart et al. | 279/46 |
| 4,569,530 | 2/1986 | Cross | 279/123 |
| 5,184,833 | 2/1993 | Cross et al. | 279/124 |

Primary Examiner—Steven C. Bishop
Attorney, Agent, or Firm—Dvorak and Traub

[57] ABSTRACT

A locking jaw assembly having a workpiece clamping top jaw securely interconnectable to a master jaw by a key locator and a lock bolt wherein the top jaw may be readily removed from the master jaw by simply loosening the lock bolt and another top jaw may be readily interconnected to the master jaw with repeatable precision by retightening the loosened lock bolt. The secure interconnection of the top jaw to the master jaw by the key locator and lock bolt is augmented by a lip portion of the master jaw received in a complementary shaped groove disposed on a flange of the top jaw wherein forces exerted by the workpiece on the top jaw tend to move the top jaw into closer contact with the master jaw and relieve tensile stresses on the key locator.

9 Claims, 2 Drawing Sheets

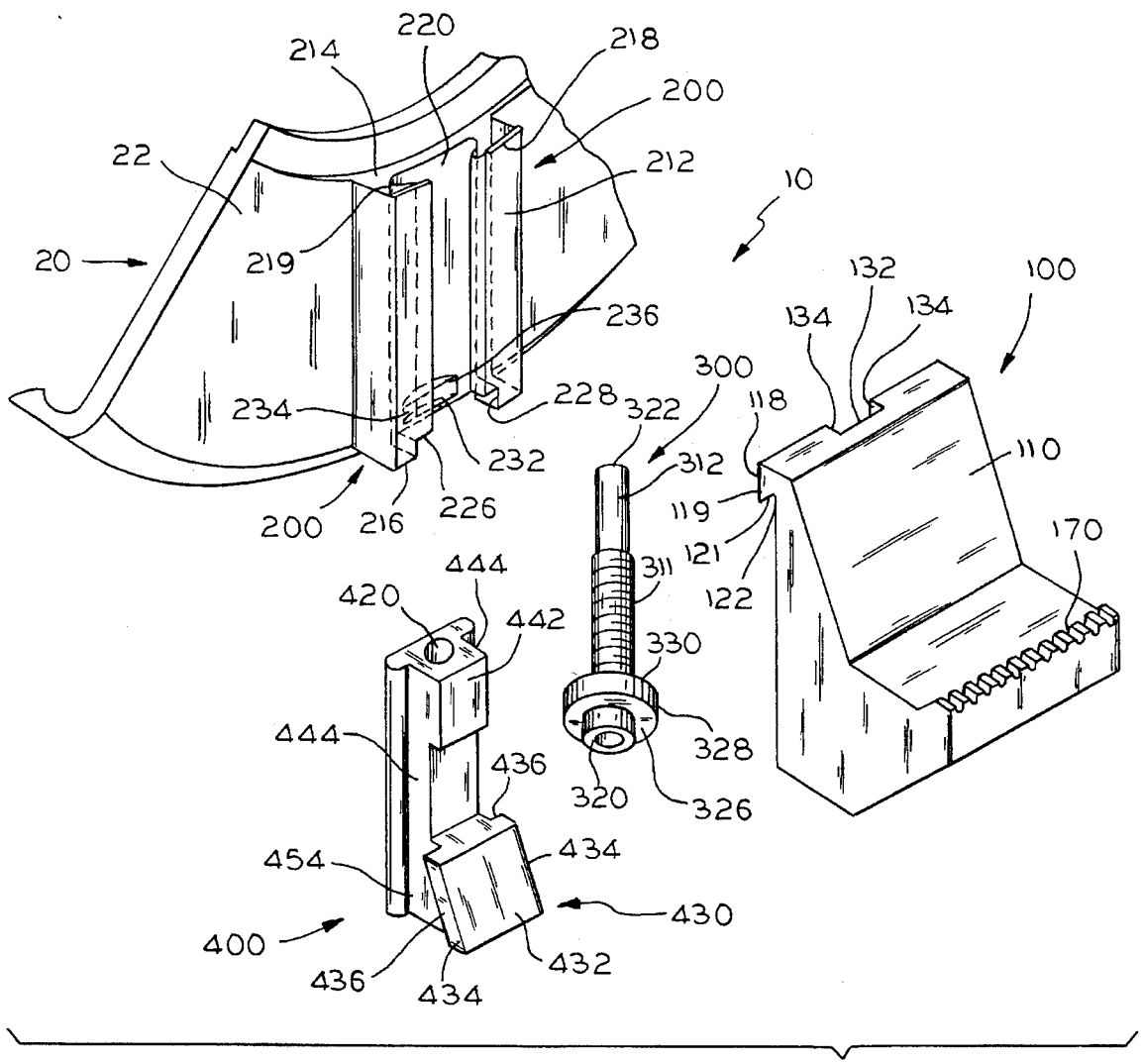
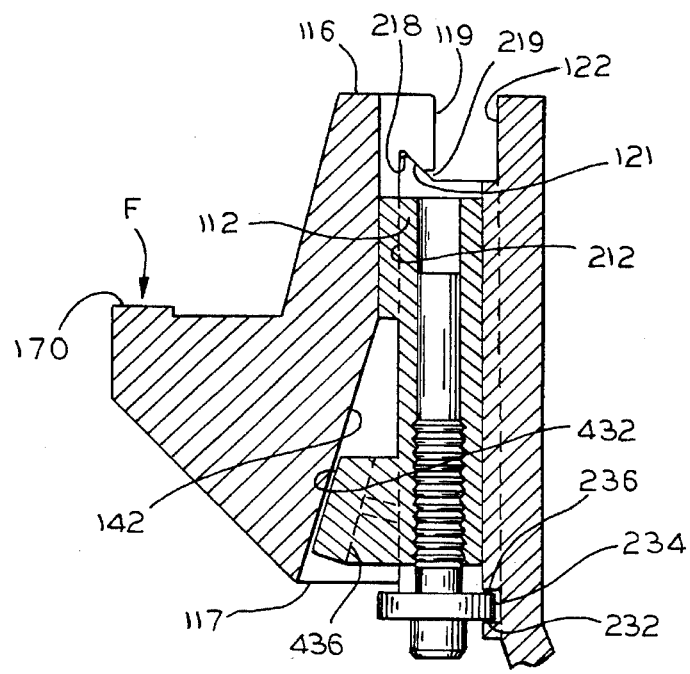

LOCKING TOOL HOLDER APPARATUS

FIELD OF THE INVENTION

The present invention relates to a tool holder, a plurality of which are typically mounted on a rotating chuck driven by a lathe spindle and more specifically to a novel locking jaw assembly having a workpiece positioning and clamping top jaw securely interconnectable to a master jaw by a key locator and a lock bolt, wherein the top jaw may be readily and precisely replaced by another top jaw without completely disassembling the locking jaw assembly.

BACKGROUND OF THE INVENTION

In machinery operations requiring precise positioning and clamping of a workpiece in a rotating chuck, it has been conventional to clamp the workpiece in a plurality of tool holders disposed on the chuck so that the tool holders are symmetrically arranged about a rotational axis of the chuck. Precision tool holders generally comprise a master jaw adjustably disposed on the chuck and often forming a part of the chuck as in the case of master jaws welded to a diaphragm of a diaphragm chuck, and in the case of a master jaw which forms an integral part of an adjustable rock arm in a Bal-Lok® chuck. The foregoing types of chucks generally provide for a limited range of precise adjustability and therefore require that the workpiece be clamped in a top jaw that may be interchangeably connected to the master jaw in order to accommodate different size workpieces. Interchangeable top jaws however, often require complete disassembly of the tool holder, which is laborious, time consuming, and often results in misplaced parts. To overcome these problems, it has been suggested to interconnect a top jaw to a master jaw with a key locator having a wedge-shaped foot and a lock bolt which may be loosened to disconnect the wedge-shaped foot of the key locator to the master jaw without removing the key locator or the lock bolt from the master jaw. In this manner, different top jaws may be interchangeably connected to the master jaw. Interchangeable tool holder assemblies however are subject to forces from the workpiece which cause reaction forces in the jaw assembly that adversely effect the precise positioning and clamping of the workpiece on the chuck. For example, in interchangeable jaw assemblies of the type discussed above, forces exerted by the workpiece on the top jaw cause, among other reactions, tensile stresses in the key locator which interconnects the top jaw to the master jaw. These tensile stresses result in stretching of the key locator which permits the top jaw to separate from the master jaw, shown exaggerated in FIG. 5, resulting in imprecise alignment and clamping of the workpiece. Accordingly, there is a demonstrated need for an advancement in the art of interchangeable tool holders.

It is therefore an object of the present invention to provide a novel locking jaw assembly for precisely clamping and positioning a workpiece.

It is also an object of the present invention to provide a novel locking jaw assembly that is economical to use and manufacture.

It is a further object of the present invention to provide a novel locking jaw assembly having a workpiece clamping top jaw securely interconnectable to a master jaw by a key locator and a lock bolt.

It is another object of the present invention to provide a novel locking jaw assembly wherein the secure interconnection of the top jaw to the master jaw by the key locator and the lock bolt is augmented by a master jaw lip received in a complementary groove on the top jaw.

It is yet another object of the present invention to provide a novel locking jaw assembly having a top jaw that may be readily and precisely replaced with another top jaw without completely disassembling the locking jaw assembly.

Accordingly, the present invention is directed toward a novel locking jaw assembly having a workpiece clamping top jaw securely interconnectable to a master jaw by a key locator and a lock bolt, wherein the top jaw may be readily removed from the master jaw by simply loosening the lock bolt, and another top jaw may be readily interconnected to the master jaw with repeatable precision by re-tightening the loosened lock bolt. The key locator includes a T-shaped body portion that is received and retained in a T-shaped slot of the master jaw by the lock bolt. A wedge-shaped foot having a T-shaped cross section extending from the key locator body portion is disposable in a wedge-shaped recess of the top jaw, and, upon rotation of the lock bolt, may be slidably moved into a wedge-shaped slot at an outer end of the top jaw, thereby fastening the top jaw to the master jaw. The interconnection of the top jaw to the master jaw by the key locator and lock bolt is augmented by a lip portion of the master jaw received in a complementary shaped groove disposed in a flange at an inner end of the top jaw wherein forces exerted by the workpiece on the top jaw tend to move the top jaw into closer contact with the master jaw and relieve tensile stresses on the key locator. These and other objects, features and advantages of the present invention will become apparent upon consideration of the following Detailed Description of the Invention with the accompanying drawings.

BRIEF DESCRIPTION OF THE DRAWINGS

FIG. 1 is a partial exploded perspective view of a locking tool holder of the present invention.

FIG. 2 is a sectional view of the locking tool holder.

DETAILED DESCRIPTION OF THE INVENTION

Figure 3:
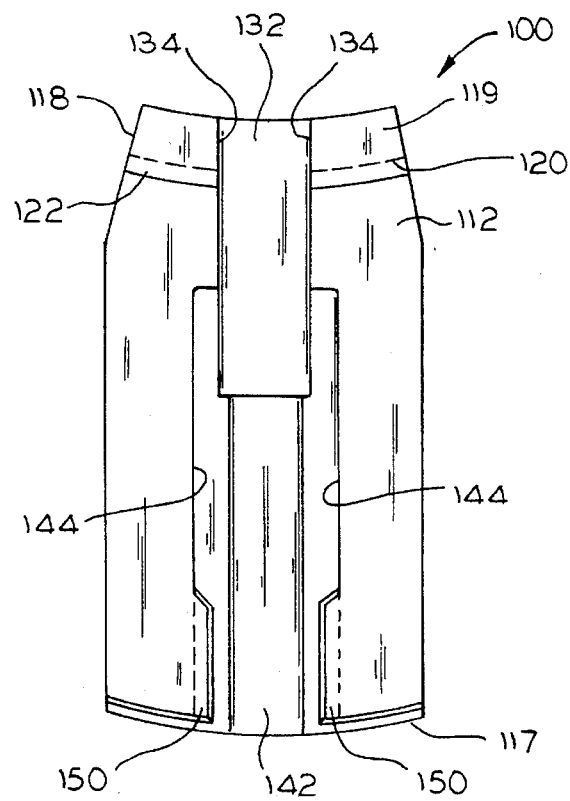
FIG. 3 is a front view of a top jaw of the present invention.

FIG. 1 is an exploded perspective view of a locking tool holder or locking jaw assembly 10 of the present invention generally comprising a top jaw 100 precisely and securely interconnectable to a master jaw 200 by a lock bolt 300 and a key locator 400. In practice, a plurality of locking tool holders 10 are disposed on a rotating chuck and symmetrically arranged along radials of the rotational axis thereof. The locking jaw assemblies 10 may also be adjustable to clamp and retain a workpiece not shown in the drawing. In the exemplary embodiment of FIG. 1, the master jaw 200 of the locking jaw assembly 10 is fixedly disposed on a diaphragm chuck 20, shown in part, having a hydraulically actuated diaphragm 22 for adjusting the plurality of locking jaw assemblies 10, although the master jaw 200 may also be disposed on other types of chucks, including a Woodworth® Universal Bal-Lok® chuck, wherein the master jaw is disposed on or integrally formed with a pivoting member which adjusts corresponding locking jaw assemblies.

FIGS. 1 and 2 show the master jaw 200 generally comprising a body having a flat front surface 212, an inner end surface 214 with a curvature substantially the same as the curvature of the diaphragm 22, and an outer end surface 216. A wedge-shaped lip portion 218 having an inner surface 219 protrudes from and extends across the curved inner end 214, and a T-shaped slot 220 extends through the master jaw 200 along a radial of the rotational axis of the chuck 20. A partial circular recess having a bottom surface 226 and a side surface 228 is formed in the outer end surface 216, and a curved recess having a bottom surface 232, a side surface 234, and a top surface 236 is formed in the T-shaped slot 220. The lock bolt 300 comprises a cylindrical shaft having a threaded screw portion 311 and a non-threaded end portion 312 formed thereon, and a collar with a disk-shaped bottom surface 326, a circular side surface 328, and a disk-shaped top surface 330. A head 320 of the bolt 300 and an axial bore extending into an end 322 opposing the head 320 may include hexagonal shaped or other engageable surfaces that may be engaged by a conventional hex-driver tool for applying a torque to the bolt 300 from either end thereof. The collar of the lock bolt 300 is disposable in the curved recess and in the partial circular recess of the master jaw 200 so that the cylindrical shaft of the lock bolt 300 extends up and into the T-shaped slot 220. The key locator 400 comprises an elongated body portion having a T-shaped cross-section and a threaded bore 420 extending through the body portion along a major axis thereof. A wedge-shaped foot 430 also having a T-shaped cross-section extends from an end of the body portion as further discussed below. In one embodiment, the T-shaped cross-section of the body portion is slidably disposable in the T-shaped slot 220 extending through the master jaw 200 with the foot 430 positioned toward the collar of the bolt 300. The non-threaded end portion 312 of the bolt 300 is extendable into the threaded bore 420 of the key locator 400 without rotation of the bolt 300 to generally align and guide the T-shaped body portion of the key locator 400 toward and into the T-shaped slot 220 from the inner end surface 214 of the master jaw 200. The threaded portion 311 of the bolt 300 is then engageable with the threaded bore 420 of the key locator 400 to reciprocate the key locator 400 in the T-shaped slot 220 of the master jaw 200 upon rotation of the bolt 300 wherein the major axis of the bolt 300 and the key locator 400 are aligned relative to a radial of the rotational axis of the chuck 20. The disk-shaped bottom surface 326 or the disk-shaped top surface 330 of the collar mate with the bottom surface 232 or the top surface 236 of the curved recess, depending on the orientation of the locking jaw assembly 10 on the chuck 20, to prevent the bolt 300 and the key locator 400 from disengaging from the master jaw 200 unless the bolt 300 is completely unthreaded from the key locator 400.

Figure 4:
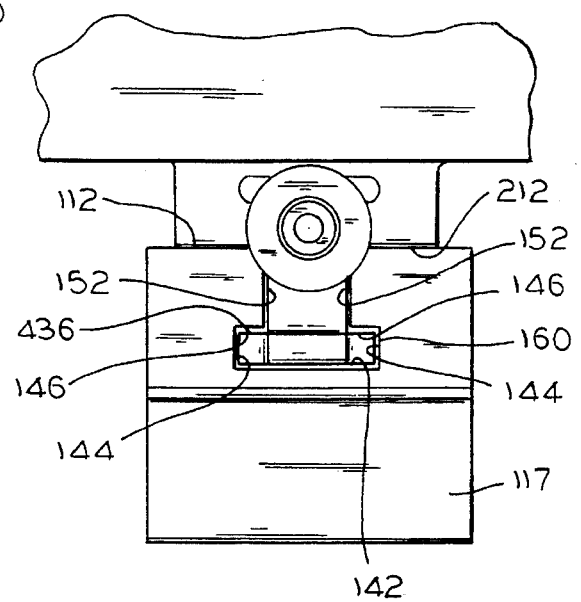
FIG. 4 is an end view of the locking tool holder.
Figure 5:
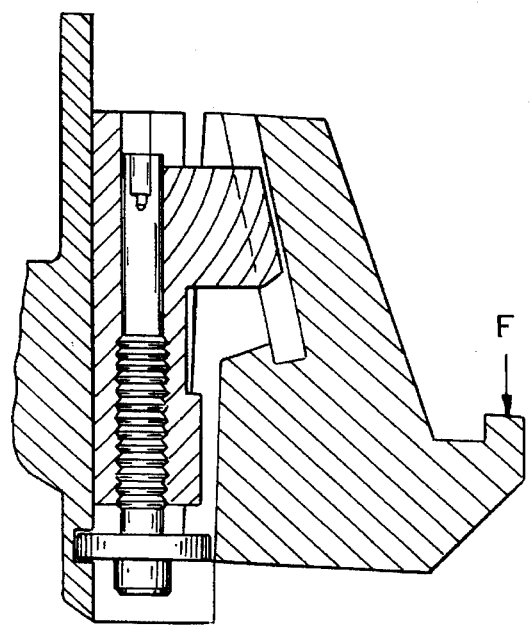
FIG. 5 is a sectional view of a prior art tool holder.

FIGS. 1, 2, 3 and 4 show the top jaw 100 generally comprising a body portion 110 having a flat front surface 112, an inner end surface 116 having a flange 118 with a front surface 119, and a wedge shaped groove 120 having an inner surface 121 formed in a lower edge 122 thereof. The lower edge 122 and the wedge-shaped groove 120 have a curvature substantially the same as the curvature of the wedge-shaped lip 218 of the master jaw 200. A channel 130 having a bottom surface 132 and opposing side walls 134 extends through the flange 118 and partially into the body portion 110 substantially perpendicular to the wedge-shaped groove 120 and the lower edge 122. A wedge-shaped recess having a bottom portion 142 and opposing side walls 144 is formed in a medial portion of the body portion 110 extending from the channel 130 to an outer end surface 117. Opposing wedge-shaped flanges 150 having opposing wedge-shaped side walls 152 extending over a portion of the bottom surface 142 of the wedge-shaped recess, forming a T-shaped slot 160 proximate the outer end surface 117 comprised of the bottom surface 142, the opposing side walls 144, upper surfaces 146, and the opposing wedge-shaped side walls 152. The top jaw 100 may also comprise a workpiece surface 170 for clamping and securely retaining a workpiece not shown in the drawing.

The top jaw 100 may be fastened to the master jaw 200 by first rotating the lock bolt 300 to position the key locator 400 relative to the master jaw 200 so that the wedge-shaped foot 430 of the key locator 400 may be positioned in the wedge-shaped recess of the top jaw 100. In the embodiment of FIG. 1, if the wedge-shaped foot 430 of the key locator 400 is positioned too close to the collar of the bolt 300, the front surface 212 of the top jaw 100 will abut the collar of the bolt 300 and the flange 118 of the top jaw 100 will abut the front surface 212 of the master jaw 200, thereby preventing the wedge-shaped foot 430 from being properly disposed in the wedge-shaped recess of the top jaw 100. When the wedge-shaped foot 430 of the key locator 400 is properly positioned in the wedge-shaped recess of the top jaw 100, a wedge surface 432 of the wedge-shaped foot 430 is adjacent to the bottom surface 142 of the top jaw 100, and opposing side surfaces 434 of the wedge-shaped foot 430 are adjacent to the opposing side walls 144 of the top jaw 100, so that the front surface 112 of the top jaw 100 is substantially parallel to but separated from the front surface 212 of the master jaw 200. The top jaw 100 may then be locked to the master jaw 200 by rotating the lock bolt 300 so that the key locator 400 and the wedge-shaped foot 430 are moved along the slot 220 of the master jaw 200 toward the collar of the bolt 300 wherein the wedge-shaped foot 430 is moved from the wedge-shaped recess and into the T-shaped slot 160 of the top jaw 100. Surfaces 436 of the wedge-shaped foot 430 then engage opposing surfaces 146 of the T-shaped slot 160 in the top jaw 100 to draw the top jaw 100 toward the master jaw 200 until front surface 112 of the top jaw 100 comes into contact with the front surface 212 of the master jaw 200, and the lip portion 218 of the master jaw 200 is disposed in and engages the complementary wedge-shaped groove 120 of the top jaw 100 so that the inner surface 219 of the lip 218 contacts the inner surface 121 of the groove 120. The top jaw 100 is properly aligned relative to the master jaw 200 along a radial of the rotation axis of the rotating collar 20 by a stem of the key locator 440 of the key locator 400, having a bottom 442 and opposing side walls 444 positioned adjacent the bottom 132 and the opposing side walls 134 of the top jaw 100, and also by a wedge-shaped stem 450 of the key locator 400 having opposing wedge-shaped side walls 454 positioned adjacent the opposing wedge-shaped side walls 152 of the top jaw 100.

When a workpiece is clamped and retained by the top jaw, forces exerted by the workpiece on the top jaw 100 set up reaction forces in the locking jaw assembly 10, including reaction forces between the lip portion 218 of the master jaw 200 and the complementary groove 120 of the top jaw 100. As discussed above, the top jaw 100 is securely fastened to the master jaw 200 toward the inner end surface 116 of the top jaw 100 by the interaction of the lip portion 118 of the master jaw 200 and the groove 120 of the top jaw 100, and toward the outer end surface 117 of the top jaw 100 by the interaction of the wedge-shaped foot 430 of the key locator 400 and the T-shaped slot 160 of the top jaw 100. Therefore, any reaction forces between the lip portion 218 of the master jaw 200 and the complementary groove 120 of the top jaw 100 will tend to move the top jaw 100 toward the master jaw 200 thereby increasing the contact between the front surface 112 of the top jaw 100 and the front surface 212 of the master jaw 200. The tendency of the top jaw 100 to move into closer contact with the master jaw 200 will also relieve tensile stress on the key locator 400. The top jaw 100 may be readily removed from the master jaw 200 by simply rotating the lock bolt 300 no more than a few turns to move the key locator 400 and the wedge-shaped foot 430 away from the collar 324 of the bolt 300 until the wedge-shaped foot 430 of the key locator 400 is moved from the T-shaped slot 160 and into the wedge shaped recess 140 of the top jaw 100, and the lip portion 212 of the master jaw 200 is removed from the groove 120 of the top jaw 100. Although the exemplary embodiment is directed toward a plurality of locking jaw assemblies 10 disposed on a chuck 20 for external chucking, wherein a workpiece for example a pipe, is disposed between and securely retained by the plurality of the top jaws 100, the locking jaw assembly 10 of the present invention may also be configured for internal chucking wherein the workpiece surrounds the plurality of top jaws which securely retain the workpiece from within, for example from within a hollow pipe, by inverting or rotating the locking jaw assemblies 180 degrees relative to the chuck 20 so that the lip portion 218 of each master jaw 200 and the grooved flange 122 of each top jaw 100 are oriented proximate an outer circumference of the chuck 20.

The foregoing description will enable one of ordinary skill in the art to make and use the preferred embodiments of the present invention. It will be understood that there exists variations, modifications and equivalents to the embodiments disclosed herein. The present invention therefore is to be limited only by the scope of the appended claims.

What is claimed is:

1. A locking tool assembly for positioning and retaining a workpiece on a chuck rotating about an axis, the locking tool assembly comprising:

a master jaw disposed on the chuck, the master jaw having a curved wedge-shaped lip extended toward the rotation axis of the chuck, and the master jaw having an inner slot extending therethrough, the slot aligned along a radial of the rotation axis of the chuck;

a key locator having a body portion securely disposable in the slot of the master jaw, the body portion slidable relative to the master jaw along the radial of the rotation axis of the chuck, the key locator also having a foot portion extending from the slot of the master jaw;

a lock bolt having a threaded shaft and a circular flange at one end, the circular flange disposable in a recess of the slot in the master jaw so that the threaded shaft of the lock bolt extends toward the rotation axis of the chuck, the lock bolt disposable in and threadedly engageable with a threaded bore of the key locator such that rotation of the lock bolt moves the key locator in the slot along the radial of the rotation axis of the chuck; and a top jaw having a curved grooved flange, the curved grooved flange being arranged and constructed to mate with the curved wedge-shaped lip of the master jaw, the curvature of the flange being matching and complementary with the curvature of the lip, a recess for receiving the foot of the key locator and a slot connected to the recess, wherein the foot may be moved from the recess into the slot and the lip of the master jaw may be disposed in the groove of the flange of the top jaw by rotating the lock bolt, thereby precisely fastening the top jaw to the master jaw.

2. The locking tool assembly of claim 1 wherein the top jaw includes a flat front surface contactable with a flat front face of the master jaw, and the top jaw includes a curved inner surface on the grooved flange of the top jaw engagable with a curved inner surface of the lip of the master jaw when the top jaw is fastened to the master jaw.

3. The locking tool assembly of claim 1, wherein the collar of the lock bolt has a top surface and a bottom surface, and the recess in the slot of the master jaw has a top surface and a bottom surface for engaging the top surface and the bottom surface of the collar to secure the lock bolt and key locator in the slot of the master jaw.

4. The locking tool assembly of claim 1, wherein the foot of the key locator is a wedge-shaped foot disposed on a wedge-shaped stem disposed on the key locator and extending from the slot of the master jaw, and the recess of the top jaw is a wedge-shaped recess having a bottom surface and opposing wedge-shaped side walls with a wedge-shaped flange disposed thereon and forming the slot connected to the recess, wherein the grooved flange is disposed proximate an inner end surface of the top jaw, and the slot connected to the wedge-shaped recess is disposed proximate an outer end surface of the top jaw, the top jaw further comprising a channel for receiving the stem of the key locator and precisely aligning the top jaw relative to the radial of the rotation axis of the chuck when the top jaw is fastened to the master jaw.

5. The locking tool assembly of claim 1, further comprising a plurality of locking tool holders disposed on the rotating chuck, wherein the locking tool holders are symmetrically arrange about the rotation axis of the chuck to precisely position and clamp the workpiece by external chucking.

6. A locking tool assembly for positioning and retaining a workpiece on a chuck rotating about an axis, the locking tool assembly comprising:

a master jaw disposed on the chuck, the master jaw having a flat front face with a curved wedge-shaped lip extended toward the rotation axis of the chuck and having a curved inner surface toward the chuck, the master jaw also having an inner slot extending therethrough, the slot aligned along a radial of the rotation axis of the chuck;

a key locator having a body portion securely disposable in the slot of the master jaw, the body portion slidable relative to the master jaw along the radial of the rotation axis of the chuck, the key locator having a wedge-shaped foot disposed on a wedge-shaped stem extending from the slot of the master jaw and a stem also extending from the slot of the master jaw;

a lock bolt having a threaded shaft and a circular flange at one end, the circular flange disposable in a recess of the slot in the master jaw so that the threaded shaft of the lock bolt extends toward the rotation axis of the chuck, the lock bolt disposable in and threadedly engageable with a threaded bore of the key locator such that rotation of the lock bolt moves the key locator in the slot along the radial of the rotation axis of the chuck the key locator and the lock bolt are secured in the slot of the master jaw by the circular flange of the lock bolt disposed in the recess of the slot in the master jaw; and a top jaw having a flat front surface and a curved grooved flange, the curved grooved flange being arranged and constructed to mate with the curved wedge-shaped lip of the master jaw, the curvature of the flange being matching and complementary with the curvature of the lip, a channel for receiving the stem of the key locator, a wedge-shaped recess for receiving the wedge-shaped stem and wedge-shaped foot of the key locator and a slot connected to the recess, wherein the wedge-shaped foot may be moved from the wedge-shaped recess into the slot by rotating the lock bolt thereby positioning the top jaw adjacent the master jaw so that the flat front surface of the top jaw contacts the flat front surface of the master jaw and the lip of the master jaw is disposed in the groove of the top jaw.

7. The locking tool assembly of claim 6, further comprising a plurality of locking tool holders disposed on the rotating chuck, wherein the locking tool holders are arranged about the rotation axis of the chuck to precisely position and clamp the workpiece by external chucking.

8. The locking bolt of claim 7 wherein the plurality of locking tool holders are rotated 180 degrees relative to the chuck so that the lip of the master jaw and the grooved flange of the top jaw are oriented proximate an outer circumference of the chuck to precisely position and clamp the workpiece by internal chucking.

9. A method for positioning and clamping a workpiece in an interchangeable top jaw interconnected by a key locator and a lock bolt to a master jaw disposed on a rotating chuck, the method comprising steps of:

supporting the key locator in a slot disposed along a radial of the rotation axis of the chuck, the slot extending through the master jaw;

adjustably retaining the key locator in the slot with the lock bolt, the key locator being slidable in the slot of the master jaw upon rotation of the lock bolt;

securely retaining the key locator and lock bolt in the master jaw by supporting a collar of the lock bolt in a recess in the slot of the master jaw;

supporting the top jaw on a wedge-shaped foot disposed on a wedge-shaped stem extending from the key locator, the wedge-shaped foot and the wedge-shaped stem disposed in a wedge-shaped recess of the top jaw and moveable into a T-shaped slot disposed in the top jaw and connected to the wedge-shaped recess; and supporting the top jaw with a curved wedge-shaped lip extending from the master jaw toward the rotation axis of the chuck, the lip engaging a curved groove on the top jaw wherein the wedge-shaped foot and the wedge-shaped stem of the key locator are moved from the wedge-shaped recess of the top jaw into the T-shaped slot of the top jaw and the lip of the master jaw engages the matching groove of the top jaw upon rotation of the lock bolt thereby precisely fastening the top jaw to the master jaw.

* * * * *